United States Patent Office 2,986,370
Patented May 30, 1961

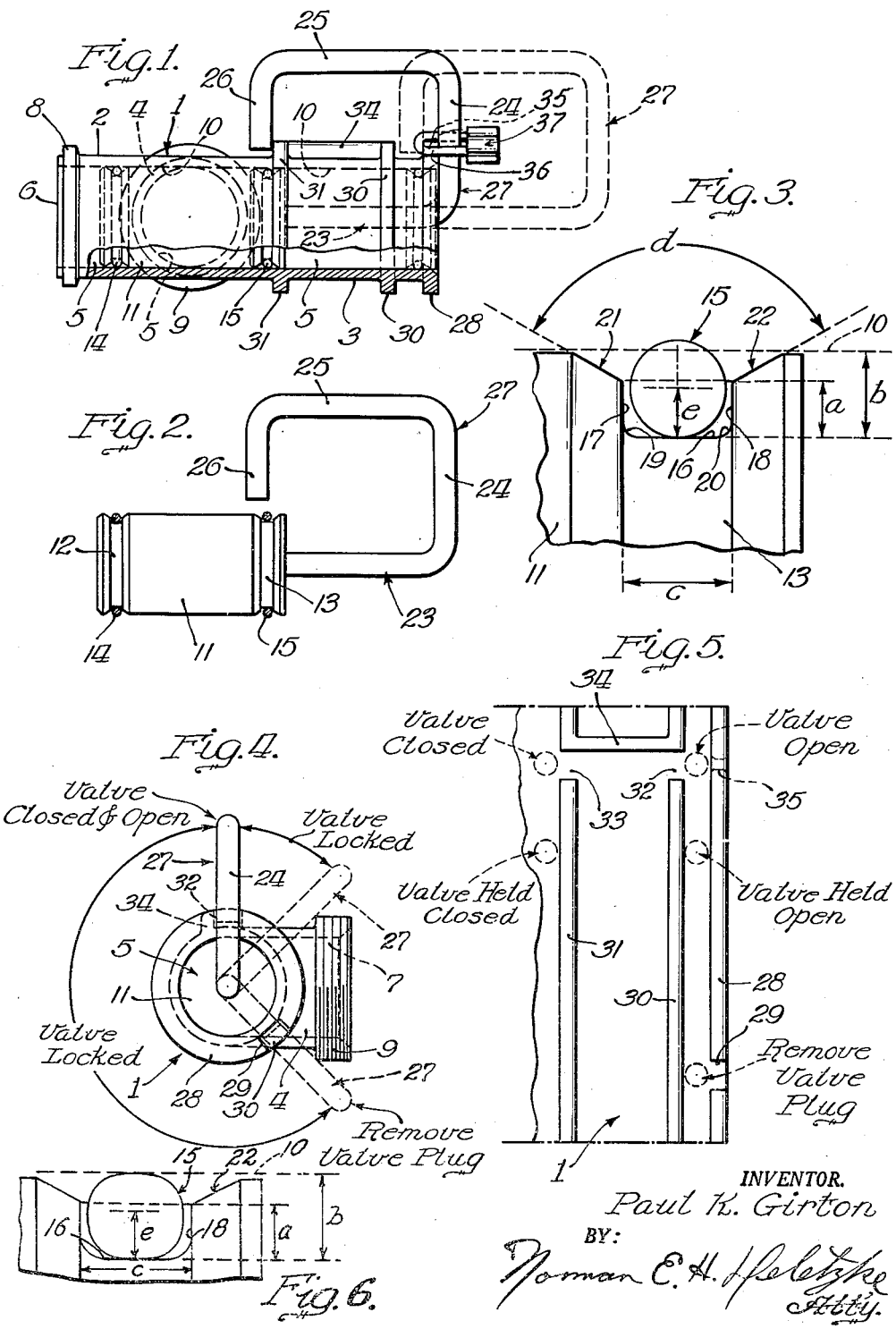

2,986,370
VALVE
Paul K. Girton, Millville, Pa.
Filed July 9, 1954, Ser. No. 442,337
10 Claims. (Cl. 251—100)

This invention pertains to improvements in valves. Specifically stated, this invention pertains to reciprocable and rotary plug or piston type valves, having relatively few parts and being of a sanitary construction, and which may be easily and quickly assembled or disassembled and cleaned. Such sanitary type valves are particularly well suited for use in the processing of food products.

More specifically stated this invention pertains to improvements in the valve housing, valve plug, seal, valve plug actuator, and valve plug motion limiting or regulating structure and locking arrangement.

The quick opening and closing type of valve contemplated by this invention is adapted for many uses, including such uses as tank or vat outlet valves, whereby the rapid draining of a tank or vat is expedited.

In valves of the general type contemplated by this invention, which are generally available or are disclosed in pertinent prior art publications, it is common practice, in some forms of such valves, to utilize plugs or piston type valve elements which are very closely fitted to the valve casing and maintained so fitted by the use of screws, or springs or the like for seating the valve plug element and for keeping the valve element seated against the valve seat. In some instances the valve stems are threaded and such threaded portion of the valve stem coacts with the valve casing or parts thereof for movement of the valve from closed to open position or vice versa upon the rotation of the valve stem.

Many of the less complex type of valves are of such construction that they may, by inadvertence or accident, be easily opened or closed when such opening and closing is not desired. Similary, many of the less complex types of valves frequently operate unsatisfactorily for the reason that they do not include successfully operable seal arrangements. In recent years the use of resilient "O-ring" type of seals has become quite popular in various kinds of valves. However, the use of "O-ring" type seals in valves intended for usage of a sanitary nature requires a design wherein the "O-ring" seals may be readily removed for cleaning of the seal rings and seal ring grooves. Similarly, the grooves in which the rings seat or are housed should also be readily accessible as well as easily cleaned and inspected. In like manner the "O-ring" type seal and the seal groove should be of such construction and arrangement as to enable the easy and rapid assembly and disassembly of the seal rings into and from the seal grooves.

It is, therefore, the objective of this invention to provide an improved valve having relatively few parts and being of relatively simple design and which may be easily and economically manufactured; wherein the flow of fluid may be effectively and completely controlled by simple and easy adjustments of the valve; wherein the parts of the valve device may be easily and quickly assembled and disassembled; wherein the valve element or plug is effectively sealed, by resilient annular seal rings, to the valve seat in the valve casing when the valve is in closed or in open position; wherein the seal rings for the valve piston are housed in grooves from which they may be easily removed when the valve is disassembled but from which they may not be removed when the valve is assembled; wherein the seal ring grooves may be easily cleaned and inspected when the valve is disassembled; wherein the valve element is easily adjustable in between open and closed position and is effectively maintained in an easily releasable manner in the position to which it has been adjusted; and wherein the valve element may be locked in its adjusted position.

The foregoing and other objectives, important novel features and advantages of this invention, will become more apparent and be more easily understood upon examination of the following description thereof and the accompanying drawings and the appended claims. It should, however, be understood that, without desire of limitation, the preferred embodiment of this invention will be described and illustrated as improvements pertaining to a combined reciprocable and rotary plug type valve. Certain changes and variations may suggest themselves to those skilled in the pertinent arts, which changes may not, however, depart from the spirit of this invention and may come within the scope of the appended claims.

In the accompanying drawings:

Figure 1 is a side elevational view, partially in broken away section, of the improved valve, showing the valve element in closed position, and by dotted lines representing the valve element in open position;

Figure 2 is a side elevational view, partially in broken away section, of the improved valve piston or plug, valve seals, and valve plug handle;

Figure 3 is an enlarged, fragmentary, elevational view, partially in section, of a portion of one end of the improved valve element illustrating the valve seal ring and seal groove positioned with respect to a dotted representation of the valve seat and with the valve ring in uncompressed position;

Figure 4 is an elevational view of the right hand end of a valve assemblage of the type illustrated in Figure 1 of the drawings, wherein dotted lines are used to illustrate several possible positions of the valve handle;

Figure 5 is a plan view of a development on a flat surface of the flanged end of the outer surface of the valve casing which is adapted to coact with the valve handle for selectively locking the valve element in open or closed position; and Figure 6 is an enlarged, fragmentary, elevational view, partially in section, similar to a portion of Figure 3 of the drawings, showing the seal ring in slightly compressed and operative position.

Referring to the drawings in which like elements are identified by like numerals, 1 represents the tubular body portion or shell of the improved valve or faucet-like structure. The valve chamber housing or casing 1 in the preferred embodiment thereof is generally formed of suitable material such as steel and may consist of a T-shaped pipe section or fitting having two axially aligned, hollow, cylindrical branches 2 and 3 and a laterally extending, hollow cylindrical branch 4. Branch 4 joins the aligned branches 2 and 3 at a ninety degree angle at their point of juncture approximately midway between the outer ends of the branches 2 and 3. A straight cylindrical bore or flow passage 5 extends in axial alignment through each of the branches 2 and 3, and a branch of the flow passage 5 extends axially through the branch 4. The outer ends of the branches 2 and 4 define the outlet and inlet ports 6 and 7 respectively for the improved valve casing 1. The ports 6 and 7 may, however, as desired, be used either as inlet or outlet ports. The branches 2 and 4 are provided at their outer ends with suitable flanges or the like elements 8 and 9 respectively whereby the valve may be satisfactorily coupled into the remainder of a flow passage or conduit system.

The straight portion of the cylindrical flow or material passage 5 for the transmission of fluid which extends in axial alignment through the aligned branches 2 and 3 of the valve shell 1 is of a uniform diameter and smoothly machined or polished so that it may serve throughout its entire length as a tubular-shaped valve seat 10 in which a cylindrical valve element or plunger or piston 11 is telescoped for longitudinal reciprocation and rotary movement for valving action in said aligned branches 2 and 3 between off and on positions with respect to the inlet and outlet ports 6 and 7.

The cylindrical valve plug or plunger 11 has an outer diameter slightly less than the inner diameter of the bore or flow passage 5 in branches 2 and 3, the cylindrical surface of which comprises the valve seat 10. The valve element 11 is provided adjacent each of its ends with annular transverse grooves or recesses 12 and 13 for receiving and carrying the annular, resilient and elastic gasket or seal or packing elements 14 and 15 respectively. The seal elements 14 and 15 are commonly referred to as O-rings. The groove 12 and seal element 14 are adjacent the port 6. The end of the valve plug 11 adjacent the groove 12 is beveled inwardly as is clearly shown in Figure 2 of the drawings.

The valve plunger 11 is of such a length that when the valve element 11 is in closed position, the plunger 11 completely traverses the junction of the branch of the flow passage 5 in valve casing arm 4 with the branches of the flow passage 5 in valve casing arms 2 and 3. When the valve is closed the seal 14 is disposed or positioned intermediate the port 6 and the nearest point of the juncture of the flow passage branches. Similarly, when the valve is closed the seal element 15 is disposed or positioned in the portion of the flow passage 5 in branch 3 beyond the juncture of the lateral arm or branch 4 with the arm or branch 3.

Branch 3 is of such length that the valve plunger or piston 11 may be moved in its entirety into that portion of the flow passage 5 which extends into branch 3. When the plunger 11 is thus moved into branch 3 to open the valve, both of the seal or gasket elements 14 and 15 engage the valve seat surface 10 in the branch 3 to the right of the lateral branch 4 as viewed in Figure 1 of the drawings. When the valve plunger 11 is in open position, fluid flows freely through the then unrestricted section of the flow passage formed by the portions of the flow passage 5 extending through the branches 2 and 4 of the casing 1.

Each of the annular grooves 12 and 13 are flared radially outwardly toward the cylindrical wall of the piston 11 as is clearly illustrated in Figures 2 and 3 of the drawings. The annular grooves 12 and 13, as clearly illustrated in Figure 3 of the drawings, are each provided with a flat annular bottom wall 16 parallel to and concentric with the axis of the piston 11. The opposed side walls of each of the grooves 12 and 13 include annular, vertically disposed, and parallel side wall portions 17 and 18 which are perpendicular to the bottom wall 16 and which extend outwardly from the bottom wall 16 to a distance $a$ which is greater than one-half of the distance between the bottom wall 16 of the associated groove 12 or 13 and the valve seat 10. The side wall portions 17 and 18 are spaced one from another an axial distance $c$ which is greater than twice the radial distance or extension $a$ which is the radial distance to which the walls 17 and 18 extend outwardly from the bottom wall 16, as viewed in Figure 3 of the drawings.

The vertical side walls 17 and 18 are joined to the annular bottom wall 16 by annular arcuate surfaces or fillets 19 and 20 respectively, and the walls 17 or 18 and their respective associated fillets 19 or 20 have a combined radial depth or extension equal to the distance $a$. The opening of each of the grooves 12 and 13 into the cylindrical surfaces of the piston 11 is in each instance defined by opposed, annular outwardly opening walls 21 and 22 extending from the outermost edge of vertical walls 17 and 18 respectively and terminating at the cylindrical surface of the valve plug 11. The wall portions 21 and 22 are positioned at an obtuse angle with respect to one another and positioned at equal acute angles with respect to a diametral plane of the piston 11 passing through the grooves 12 or 13 with which the respective wall portions 21 and 22 are associated. The obtuseness of the angle $d$ between the walls 21 and 22 is preferably increased as the diameter of piston 11 and the diameter of the packing or seal rings 14 and 15 are increased. Similarly, when valve plug 11 and seal rings 14 and 15 have decreased diameters, the obtuseness of the angle between the walls 21 and 22 is also decreased.

The seal rings 14 and 15 are each of the type commonly known as O-rings and are of a circular or annular shape having a circular cross section and are preferably composed of or formed of a resilient, elastic rubber, or resilient, elastic rubber-like material. The normal inner diameter of the seal rings 14 and 15 is slightly less than the diameter of the annular bottom wall 16 of the grooves 12 or 13, so that the rings 14 and 15 will, when fitted into a groove 12 or 13, fit snugly against the bottom 16 of the grooves 12 or 13. The normal outer diameter of the seal rings 14 and 15, as well as the distended diameter of the seal rings 14 and 15 when fitted into the grooves 12 or 13, is slightly greater than the diameter of the valve seat 10, so that the rings 14 and 15 when operatively mounted on plug 11 in the valve casing 1, will be compressed slightly between the bottom walls 16 of the grooves 12 and 13 and the valve seat 10 of the valve casing 1, as illustrated in Figure 6 of the drawings. The cross sectional radius $e$ of the seal rings 14 and 15 when operatively compressed as well as normally, is slightly less than the radial extensions $a$ of the groove walls 17 and 18, as a result whereof the rings 14 and 15 will, under normal operation in the valve, establish and maintain the desired seal between the valve plug 11 and the valve seat 10 and yet not tend to roll up on to the inclined wall portions 21 and 22 of the grooves 12 and 13. The cross section diameter of seal rings 14 and 15 is less than the distance $c$ between the walls 17 and 18 of the grooves 12 and 13, as a result whereof, in the operation of opening and closing the improved valve by sliding the valve piston 11 back and forth in the valve casing 11, the slightly compressed seal rings 14 and 15 may roll slightly in the grooves 12 and 13 to properly adjust themselves in sealing position between the co-axial annular surfaces 16 and 10. The normal cross sectional diameter of the seal rings 14 and 15 is greater than, but the cross sectional diameter of those rings when partly compressed and operatively seated in the grooves 12 and 13 is less than, the radial distance $b$ between the annular bottom wall 16 of the grooves 12 and 13 and the annular valve seat 10, as clearly illustrated in Figure 3 of the drawings. This arrangement assures the proper sealing compression of the rings 14 and 15 when in operative position in the grooves 12 and 13 between the co-axial annular surfaces 16 and 10.

A valve stem 23 is centrally fixed to the end of the valve plunger or plug 11 adjacent the branch 3 and extends centrally out of the open end of the branch 3. The free end or extension of the stem 23 is formed into the general shape of a loop or handle-like element, or manipulation element 27, disposed longitudinally and laterally with respect to the axis of the valve piston 11. The valve stem 23 extends axially to the right of the piston 11, as viewed in Figure 1 of the drawings, a distance equal to the distance between the right hand or free end of the valve casing branch 3 and the adjacent end of the piston 11 when the piston 11 is in valve closing position as shown in full lines in the broken away portion of Figure 1 of the drawings. A segment 24 of the extension of stem 23 which is formed into the handle 27 thence extends laterally from stem 23 at a right angle to the axis of piston 11 a distance appreciably greater than the radius of the branch 3 of the valve casing 1. A segment 25 of handle or bail 27 thence extends from the outer end of segment 24 parallel to the axis of piston 11 and valve stem 23 in overlapping relation to the branch 3 of the valve casing 1. A re-entrant segment 26 extends from the left end of segment 25, as viewed in Figure 1 of the drawings, parallel to segment 24 back toward the outer surface of branch 3 of the valve casing 1 with the free end of segment 26 immediately adjacent but not in engagement with the cylindrical surface of branch 3 of casing 1.

The loop-shaped extended segments 24, 25 and 26 of the valve stem 23 comprise the hand grip and lock element 27 which may be used for actuation and adjustment of the valve piston 11 in the valve casing 1 to open or close the improved valve by extending the piston 11 into or withdrawing it from a position in which it interrupts the juncture of the flow passage 5 at the locus of connection of the valve case branches 2 and 4.

The loop-shaped hand grip 27 also coacts with the flanged or ribbed outer surface and end face of the valve casing branch 3, which coacting arrangement of parts comprises a locking and regulating device whereby the valve piston 11 may be locked or secured in a selected adjusted open or closed position as desired. If desired, the valve plug 11 may be completely removed rapidly and easily from the valve housing or casing 1. To enable such operation the outer annular end of the branch 3 of casing 1 is perpendicular to the axis of reciprocal motion of valve piston 11 in the branches 2 and 3 of casing 1 and is provided with a peripheral substantially annular flange 28 interrupted at 29. The interruption 29 is positioned toward the lower portion of the flange 28 as viewed in Figures 1 and 4 of the drawings. Two annular interrupted peripheral flanges 30 and 31 are provided on the outer periphery of the valve casing branch 3 having interruptions 32 and 33 respectively. The interruptions 32 and 33 are positioned at the upper portions of the flanges 30 and 31 respectively as viewed in Figures 1 and 4 of the drawings. The ends of the flanges 30 and 31 nearest the viewer as shown in Figure 1 of the drawings are joined by a guide bar 34.

The annular flanges or cams or shoulders 28, 30 and 31 are each of a radial depth greater than the distance between the outer periphery of branch 3 and the free end of the cam follower or flange follower segment 26 of the motion limiting valve handle 27, but are of a lesser radial depth than the distance between the periphery of branch 3 and the segment 25 of the valve handle 27. The interruptions 29, 32, and 33 in the annular radially projecting flanges or ribs 28, 30 and 31 respectively are each of such a radial depth with respect to those annular flanges and are each of such a circumferential width axially of the branch 3 that the free end of the segment 26 may, upon the appropriate reciprocal and rotary movement of the valve stem 23 and the consequential reciprocal and rotary movement of the handle 27 be moved as desired through the interruptions 29, 32 and 33 in the annular flanges 28, 30 and 31.

The flange 30 is spaced from the flange 28 a distance to the left thereof as viewed in Figure 1 of the drawings slightly greater than the thickness of the end of the segment 26 measured longitudinally of the valve casing 1. The flange 31 is spaced from the flange 28 to the left thereof as viewed in Figure 1 of the drawings, so that the right hand face of the flange 28 is spaced from the left hand face of the flange 31 longitudinally of branch 3 of the valve casing 1 a distance only slightly less than the comparable longitudinal spacing between the adjacent surfaces of the segments 24 and 26 of the handle element 27.

An aperture 35 extends longitudinally through the flange 28 in substantial alignment with the interruptions 32 and 33 in the flanges 30 and 31, whereby the U-shaped shackle 36 of a suitable lock 37 as illustrated in Figure 1 of the drawings, may be extended through the aperture 35 and around either handle portions 24 or 26 adjacent flange 28 to lock handle 27 and valve piston 11 in either closed or open position as the case may be.

The piston 11 may be releasably retained in open position without the use of a lock shackle by merely rotating the handle 27 slightly in a clockwise direction as viewed in Figure 4 of the drawings, after the piston 11 has been moved into branch 3, until the end of element 26 is trapped between the flanges 28 and 30. Similarly, the valve may be releasably held in closed position by moving the valve handle into the position indicated in full lines in Figure 1 of the drawings until the inner surface of segment 24 engages the adjacent surface of flange 28 and then rotating the handle 27 slightly clockwise until the free end of segment 26 of handle 27 engages the adjacent side edge surface of flange 31.

In the assembly of the improved valve the seal rings 14 and 15 are assembled in the grooves 12 and 13 on piston 11 as illustrated in Figure 2 of the drawings. The assembled piston and seal rings are then inserted into the valve casing 1 through the open end of branch 3 by inserting the beveled end of piston 11 adjacent groove 12 into that opening and passing the end of the handle segment 26 through the interruption 29 in flange 28 until the end of segment 26 is free to move in the space between the flanges 28 and 30. In this position the valve is open and fluid may flow freely through the flow passage 5 extending through branches 2 and 4 of the valve casing 1. The valve piston 11 may be releasably set in desired position of open or closed adjustment by engaging the free end of the segment 26 between the flanges 28 and 31 or by engaging the segments 24 and 26 with flanges or stops 28 and 32, respectively, in the manner described, or it may be secured by use of a lock in valve open or closed position in the manner hereinbefore described. To close the valve it is necessary to rotate handle 27 to move the end of stem portion 26 into alignment with the interruptions 32 and 33 in flanges 30 and 31 whereupon the handle 27 is then moved from right to left as viewed in Figure 1 of the drawings, i.e. from dotted line position to full line position of handle 27. Such movement of the handle 27 will move valve piston 11 into valve closing position where the piston 11 completely overlaps the juncture of branch 4 with branches 2 and 3 of casing 1 and interrupts the flow passage 5 extending through branches 2 and 4. In such valve closed position the handle segment 24 abuts against the right hand face of flange 28 and the end of segment 26 extends slightly beyond flange 31 and can be forced into valve locking engagement with flange 31 by a slight rotation of handle 27. The valve may be locked in open or closed position in the manner hereinbefore described, i.e. by the use of the shackle of a lock to secure segment 24 or segment 26 to the flange 28. In the arrangement illustrated in Figure 1 of the drawings, the coaction between flange 28 and handle segment 24 prevents the piston 11 from moving farther to the left and the coaction between the handle portion 26 and the flange 31 when placed in engagement by slight rotation of handle 27 prevents the piston from moving to the right. When the valve is in open position as illustrated by the dotted line representation of handle 27 in Figure 1 of the drawings, and the handle 27 has been slightly rotated, then the end of segment 26 of handle 27 engages either flange 28 or flange 30, thereby preventing any reciprocal movement of piston 11 from its open position. The valve may be quickly disassembled by reversing the assembly procedure described above.

In the use of the valve the ports 6 and 7 may be interchangeably used as inlet or outlet ports. The use of the port 7 as the inlet port when handling fluid under superatmospheric pressure or the use of port 7 as the discharge port when handling fluid under sub-atmospheric pressure will decrease the tendency of the effective pressure on the fluid to move the piston 11 either into open or closed position for the reason that the pressure will exert equal and opposite forces on the two seals 14 and 15 thereby neutralizing the tendency of the pressure of the fluid to move the piston 11.

In completing the disassembly of the improved valve, after the piston 11 has been removed from casing 1, the seal rings 14 and 15 may be easily removed or "snapped" out of the grooves 12 and 13 by slight upward and outward pressure against the side of the rings 14 and 15 whereby to roll them out from between the vertical wall portions 17 and 18 of grooves 12 and 13 and on to the inclined wall portions 21 and 22, after which they may be rolled from piston 11 in any convenient manner.

From the foregoing description of this invention and from the accompanying drawings, it will be apparent that this invention realizes the introductorily enumerated objectives respecting the improved valve which possesses the mentioned advantages and provides a new, unique and useful valve device.

Having thus described and illustrated the preferred embodiment of this invention and the manner of its functioning, the invention is not to be interpreted as being restricted to the specifically illustrated and described embodiment, except insofar as is necessitated by the disclosure of the prior art and the appended claims.

The invention is claimed as follows:

1. A valve comprising, in combination, a valve chamber member having a fluid passage extending therethrough, the inner wall of said fluid passage comprising a valve seat for a valve element, an inlet port communicating with said passage, an outlet port communicating with said passage, a valve element mounted for movement within said valve seat for opening and closing said outlet port, and seal means for prevention of fluid leakage between said valve seat and said valve element, said seal means comprising a resilient elastic packing element seated in a recess in said valve element and slightly compressed between the bottom of said recess and the seat for the valve element, said recess having in its radially outermost portion a cross section in the shape of a truncated triangle immediately adjacent to the periphery of said valve element with the largest side thereof comprising the width of the opening of said recess into the surface of said valve element and having in its radially innermost portion a cross section substantially in the shape of a rectangle.

2. The combination of a cylinder having a cylindrical inner surface comprising a valve seat and a cylindrical piston type valve element telescoped into and housed within said cylinder, said piston being coaxial with said cylinder and having an outer diameter slightly less than the inner diameter of said cylinder for substantially frictionless reciprocatory and rotary movement of said piston within said cylinder, a resilient annular elastic packing element normally having a circular cross section and positioned in slightly radially compressed form between the adjacent cylindrical surfaces of said cylinder and said piston, an annular groove in the cylindrical periphery of said cylinder, said groove having an annular bottom portion spaced from the adjacent surface of said cylinder a distance sufficient only to receive said gasket element when the normal radial dimension of said gasket has been slightly compressed and having parallel inner side wall portions perpendicular to the axis of said cylinder and having outer V-shaped side wall portions opening into the periphery of said cylinder and extending radially inwardly less than the radial depth of said groove.

3. The combination of a cylinder having a cylindrical inner surface comprising a valve seat and a cylindrical piston type valve element telescoped into said cylinder, said piston being coaxial with said cylinder and having an outer diameter slightly less than the inner diameter of said cylinder for substantially frictionless reciprocatory and rotary movement of said piston within said cylinder, a groove in the outer periphery of said piston, said groove having an annular flat bottom wall parallel to the axis of said piston and having two opposed parallel side wall portions extending radially outwardly from said bottom wall toward the periphery of said cylinder and having two opposed angular side wall portions positioned at an obtuse angle to one another and joining the outer edges of said parallel side wall portions and the cylindrical periphery of said piston, said side walls being perpendicular to said bottom wall and being each joined to said bottom wall by a separate concave annular fillet, said parallel side walls combined with said concave fillets having a total radial depth greater than one-half of the radial distance between said bottom wall and the inner surface of said cylinder, a resilient annular elastic packing element in said groove, said packing element when not compressed normally having a circular cross section and normal cross section diameter slightly greater than the radial distance between said bottom wall and the inner surface of said cylinder.

4. A device according to claim 3, wherein the axial width of said groove intermediate said parallel walls is greater than the axial dimension of the compressed packing element when compressed in said groove in operative sealing position intermediate said bottom wall and the inner surface of said cylinder.

5. A seal assembly for sealing the space between a pair of members and in which one member is formed with a recess having the outer ends of the side walls of the recess at the locus of the opening of the recess into the recessed member so inclined as to form an acute angle with the adjacent surface of the other member of the pair of members to be sealed and having the remaining portions of side walls of the recess angularly disposed to the outer ends of the side walls, and a resilient elastic packing element carried in said recess slightly compressed between the bottom of said recess and the adjacent surface of the other member to be sealed.

6. In combination with two cylindrical telescoped elements having slight clearance for frictionless sliding movement one within the other, said first member having a smooth inner cylindrical wall, said second member having a circumferential groove the cross section of which taken longitudinally of the second member and in a radial plane of said second member opens outwardly into the periphery of the second member in the form of a truncated triangle with the largest and radially outermost side thereof adjacent the first member and the radially innermost side thereof intermediate the periphery of the second member and the bottom of the groove, the cross section of the innermost portion of said groove taken in the same plane being substantially in the form of a rectangle and a resilient elastic and annular sealing element in said groove compressed between the bottom of said groove and the first member, said seal element having a circular cross section in the same plane in which a portion of said groove has a cross section in the shape of said truncated triangle.

7. A plug valve comprising, in combination, a cylindrical chamber comprising a valve seat having a plurality of ports, a plug adjustably disposed within said valve seat for opening and closing said ports, generally annular groove means provided at opposite ends of the outer longitudinal periphery of said plug, each of said groove means having a cross section taken in an axial plane longitudinally of said plug in the portion of said groove immediately adjacent the opening thereof into the periphery of said plug in the form of a truncated triangle, an annular sealing element normally of substantially circular cross section longitudinally of said plug disposed in each of said groove means and slightly compressed radially of said plug intermediate the respective bottoms of said groove means and the adjacent inner surface of said chamber to prevent leakage between said plug and said chamber when the valve is closed or open by establishing a sealed fit between said plug and said chamber, the portion of said groove means furthest removed from the opening thereof having an annular bottom portion spaced from said valve seat a distance sufficient only to receive said seal element when the normal radial dimension of said seal element has been slightly compressed and having parallel side wall portions perpendicular to said valve seat, plug actuator means secured to said plug and extending from said chamber, and hand grip and plug securing means extending from said actuator for manual adjustment or actuation of said plug and for securing said plug in desired adjusted position.

8. A valve comprising, in combination, a valve body having a cylindrical valve seat, a valve plug telescoped into and housed within said valve seat, said chamber and said plug having confronting and complementary surfaces, a groove in said plug in the surface thereof adjacent the surface of said body defining said chamber, said groove having side walls in its radially outermost portion which converge toward one another from the opposite outer edges of said groove inwardly partially toward the bottom of said groove, the bottom portion of said groove having a substantially rectangular cross section, said side walls being disposed at acute angles to the adjacent surface of said chamber, and a resilient elastic packing element compressed between the bottom of said groove and the adjacent surface of said chamber, said packing element when thus compressed being of a maximum cross sectional dimension less than the minimum spacing between said converging side walls.

9. A valve comprising, in combination, a T-shaped hollow shell having a first branch comprising part of a fluid passage, a second branch in alignment with said first branch, the inner surfaces of said branches comprising a continuous cylindrical valve seat surface, a third branch intermediate said first branch and said second branch and extending laterally from said shell and comprising part of a fluid passage, said second branch having a free end which is unobstructed and which is open to and exposed to the atmosphere at the maximum diameter of said valve seat surface, a valve plunger housed intermediate the ends of said cylindrical valve seat surface and mounted for reciprocable and rotary movement in a straight line in said first branch and in said second branch, a transverse outwardly opening recess in said plunger, the longitudinal cross section of said recess at its radially outer and widest cross section being in the shape of a truncated triangle and at its radially inner and narrowest cross section being in the shape of a rectangle, a resilient seal ring compressed between the bottom said groove and the adjacent surface of said shell, plunger actuating means secured to said plunger and having a stop means follower segment at the unattached end thereof, and a plurality of stop means on said shell for coaction with said follower for securing said plunger in desired adjusted valve open or valve closed position, said valve plunger and said plunger actuator means being so constructed and arranged that they may be withdrawn as a unit through said free end when said plunger is not in adjusted valve open or valve closed position.

10. In combination, a cylindrical seat for an annulaor seal element, seal carrying means which is axially and circumferentially movable with respect to said seat, a resilient elastic annular seal element seated in a radially outwardly opening annular recess in the surface of said seal carrying means and being slightly compressed between said seal carrying means and said seat, said recess having in its radially outermost portion a first cross section in the shape of a truncated triangle immediately adjacent to the periphery of said seal carrying means with the largest side of said first cross section comprising the width of the opening of said recess into the outer surface of said seal carrying means and having in its radially innermost portion a second cross section substantially in the shape of a rectangle.

References Cited in the file of this patent

UNITED STATES PATENTS

| | | |
|---|---|---|
| 4,419 | Clarke | Mar. 14, 1846 |
| 797,796 | Devlin | Aug. 22, 1905 |
| 1,463,735 | Varrieur | July 31, 1923 |
| 1,650,589 | Anderson | Nov. 29, 1927 |
| 1,791,312 | Hegyes | Feb. 3, 1931 |
| 2,097,733 | Miller | Nov. 2, 1937 |
| 2,314,683 | Berry | Mar. 23, 1943 |
| 2,360,733 | Smith | Oct. 17, 1944 |
| 2,442,642 | Eckel | June 1, 1948 |
| 2,462,586 | Whittingham | Feb. 22, 1949 |
| 2,690,322 | Stansfield | Sept. 28, 1954 |
| 2,723,829 | Anderson | Nov. 15, 1955 |
| 2,763,459 | Anderson | Sept. 18, 1956 |

FOREIGN PATENTS

| | | |
|---|---|---|
| 13,261 | France | Apr. 18, 1855 |
| 13,049 | Great Britain | Aug. 19, 1889 |

OTHER REFERENCES

"Rubber O-Ring Seals" in Product Engineering, June 1951, pp. 130–135. (Copy in Scientific Library.)